3,346,648
BENZYL ETHERS
Calvin J. Worrel, Detroit, Mich., assignor to Ethyl Corporation, New York, N.Y., a corporation of Virginia
No Drawing. Filed Sept. 1, 1961, Ser. No. 135,428
4 Claims. (Cl. 260—611)

This invention relates to novel and useful chemical compounds and the preparation and uses thereof. Specifically, this invention relates to dialkyl hydroxy benzyl ethers, their preparation from dialkyl phenols and their uses as antioxidants.

Phenolic compounds have found utility as antioxidants in various organic media. In general, they have been found to have a high degree of specificity. Thus, compounds effective in one medium are often found to have no effect or even a deleterious effect in other media. Further, even in the same media the effectiveness of an antioxidant is greatly influenced by the environment. Thus antioxidants effective at low temperatures are often found ineffective when exposed to high temperatures. Also in the processing of various media, such as rubber and the synthetic polymers, many antioxidants otherwise effective are completely useless due to their volatility. Applicant, however, has discovered a certain class of phenolic compounds which, contrary to the properties of phenolic compounds in general, are effective antioxidants in a large and varied range of organic media. Further, the volatility and stability of applicant's compounds are such that they are highly suitable for use in media which are to be subjected to high processing temperatures.

Another problem often encountered in the antioxidant art is that of staining and discoloration. This problem especially manifests itself in the rubber and synthetic polymer areas where discoloration and staining of the product precludes commercial acceptance. This problem is effectively solved by the use of applicant's compounds. Not only are they effective antioxidants but they operate with a minimum of discoloration or staining.

It is, therefore, an object of this invention to provide novel and useful chemical compounds. Another object is to provide novel and useful dialkyl hydroxy benzyl ethers. A further object is to provide a process of preparing the novel benzyl ethers of this invention. A still further object is to provide improved compositions of matter containing the various compounds of this invention. A specific object is to provide rubber stabilized against oxidative deterioration. Other important objects of this invention will be apparent from the following description.

According to this invention the above and other objects are accomplished by providing, as a new composition of matter, a compound having the formula I.
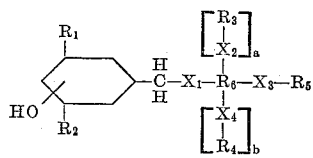

wherein $R_1$ and $R_2$ are each independently selected from the group consisting of alkyl radicals of from 1–12 carbon atoms, cycloalkyl radicals of from 5–8 carbon atoms, aralkyl radicals of from 6–11 carbon atoms, aryl radicals of from 6–10 carbon atoms and alkaryl radicals of from 7–15 carbon atoms; $R_3$, $R_4$ and $R_5$ are each independently selected from the group consisting of hydrogen and groups having the formula II.
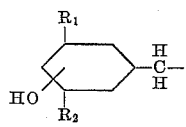

$X_1$, $X_2$, $X_3$ and $X_4$ are each independently selected from the group consisting of oxygen and sulfur; $a$ and $b$ are each independently selected from integers having the value 0 to 1; and $R_6$ is an aliphatic hydrocarbon of from 2–6 carbon atoms and is divalent when $a$ and $b$ are 0, trivalent when $a$ plus $b$ is 1 and tetravalent when $a$ plus $b$ is 2, said valencies being on different carbon atoms, that is, no more than one oxygen or sulfur is on any single carbon atom.

Examples of the compounds of this invention include:

1,2,3-tris[3-(p-ethylbenzyl)-4-hydroxy-5-(p-n-propylbenzyl)benzyloxy]-4-[3-(p-ethylbenzyl)-4-hydroxy-5-(p-n-propylbenzyl)benzylthio]-n-butane;
1,4-bis[3-(α-methylbenzyl)-5-n-butyl-2-hydroxybenzyloxy]-2-hydroxymethyl-3-mercaptomethyl-n-butane;
1,3-bis(3,5-dibenzyl-4-hydroxybenzyloxy)-2-(3,5-dibenzyl-4-hydroxybenzylthiomethyl)-n-propane;
1,2,3-tris(3,5-di-n-dodecyl-2-hydroxybenzyloxy)-n-propane;
1,3-bis(3-p-n-amylphenyl-5-p-n-nonylphenyl-4-hydroxybenzyloxy)-n-propane;
1-(3-n-amyl-5-cycloheptyl-2-hydroxybenzyloxy)-4-(3-n-amyl-5-cycloheptyl-2-hydroxybenzylthio)butane;
1,3-bis(3,5-di-p-n-hexylphenyl-4-hydroxybenzyloxy)-2,2-bis(3,5-di-p-n-hexylphenyl-4-hydroxybenzyloxymethyl)-n-propane;
1,6-bis(3-benzyl-5-cyclohexyl-2-hydroxybenzylthio)-2,4-dihydroxy-n-hexane;
1,2,5-tris[3-(2-hexyl)-4-hydroxy-5-(1-naphthyl)benzylthio]-4-hydroxy-n-pentane;
1,2,3-tris(3,5-dicyclooctyl-2-hydroxybenzylthio)-n-propane;
1,2,3-tris[3-(α,α-dimethylbenzyl)-5-n-decyl-4-hydroxybenzylthio]-5-[3-(α,α-dimethylbenzyl)-5-n-decyl-4-hydroxybenzyloxy]-n-pentane;
1-(3-cyclooctyl-5-n-heptyl-2-hydroxybenzyloxy)-6-mercapto-n-hexane;
1,2-bis(3-m-n-heptylphenyl-4-hydroxy-5-o-n-octylphenylbenzyloxy)-n-propane;
1-[3-(α,α-diethylbenzyl)-2-hydroxy-5-n-octylbenzyloxy]-2,2-dihydroxymethyl-n-butane; and
1,2,3,4-tetrakis(4-hydroxy-3-p-methylphenyl-5-n-nonylbenzylthio)-n-butane.

A preferred embodiment of this invention consists of compounds of Formula I wherein $a$ and $b$ are 0 and $R_6$ is ethylene. These are preferred because of their ease of preparation from readily available starting materials and their excellent antioxidant properties. Among the compounds represented by this preferred embodiment are:

3-(3-dodecyl)-4-hydroxy-5-n-octylbenzylthiohydroxyethane;
bis(3,5-di-tert-butyl-4-hydroxybenzylthio)ethane;
3-benzyl-2-hydroxy-5methylbenzylthiohydroxyethane;
bis(3-cyclohexyl-5-ethyl-4-hydroxybenzylthio)ethane;
3-(α-ethyl-α-methylbenzyl)-2-hydroxy-5-(2-n-undecyl)benzyloxymercaptoethane;
bis(4-hydroxy-3-p-ethylphenyl-5-n-propylbenzyloxy)ethane;
and 3,5-dicyclopentyl-2-hydroxybenzyloxyhydroxyethane.

A particularly preferred embodiment of this invention consists of compounds having the formula III.
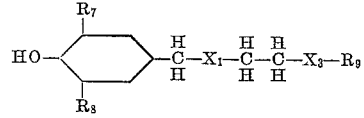

wherein $X_1$ and $X_3$ are as described following Formula I, $R_7$ is an alkyl group of from 1-12 carbon atoms, $R_8$ is an alpha-branched alkyl group of from 3-12 carbon atoms and $R_9$ is selected from the group consisting of hydrogen and groups having the formula IV. 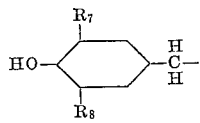

These compounds are particularly preferred because of their excellent stability and their superior antioxidant properties. Among the compounds represented by this embodiment are:

3,5-di-tert-butyl-4-hydroxybenzylthiomercapto-
  ethane;
bis(3-tert-butyl-4-hydroxy-5-methylbenzylthio)ethane;
3-tert-amyl-4-hydroxy-5-(2-nonyl)benzylthiohydroxy-
  ethane;
3-sec-butyl-4-hydroxy-5-methylbenzyloxy-3'-sec-
  butyl-4'-hydroxy-5'-methylbenzylthioethane;
3-(4-dodecyl)-5-n-hexyl-4-hydroxybenzyloxymercapto-
  ethane;
and bis[3-n-heptyl-4-hydroxy-5-(3-n-undecylbenzyl-
  oxy]ethane.

A further particularly preferred embodiment of this invention consists of compounds of Formula III wherein $R_9$ is a group of Formula IV and wherein $X_1$ and $X_3$ are both oxygen. These compounds are the most particularly preferred because they have excellent stability, low volatility, are most superior antioxidants and can be incorporated into a wide range of organic media. Among the compounds represented by this embodiment are:

3,5-di-tert-butyl-4-hydroxybenzyloxyhydroxy-
  ethane;
bis(3,5-di-tert-butyl-4-hydroxybenzyloxy)ethane;
3-tert-butyl-4-hydroxy-5-methylbenzyloxyhydroxy-
  ethane;
bis(3-tert-butyl-4-hydroxy-5-methylbenzyloxy)-
  ethane;
4-hydroxy-3,5-diisopropylbenzyloxyhydroxyethane;
and bis(4-hydroxy-3,5-diisopropylbenzyloxy)ethane.

The particular compounds, bis (3-5-di-tert-butyl-4-hydroxybenzyloxy)ethane and 3,5-di-tert-butyl-4-hydroxybenzyloxyhydroxyethane have been found by applicant to be highly effective non-staining, non-discoloring, non-volatile compounds which are compatible with a wide variety of organic media. Accordingly, these compounds are the most particularly preferred embodiments of this invention.

The compounds of this invention can be produced by the reaction of a phenol having the formula V. 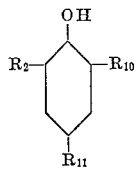

wherein $R_2$ is as described following Formula I and $R_{10}$ and $R_{11}$ are each independently selected from the group consisting of hydrogen and $R_2$ such that one of $R_{10}$ and $R_{11}$ is hydrogen and the other is $R_2$; with formaldehyde and a compound selected from the group consisting of polyhydric alcohols, polythiols and hydroxythiols; said compounds having the formula VI. 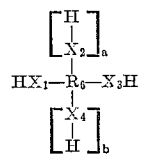

wherein $R_6$, $X_1$, $X_2$, $X_3$, $X_4$, $a$ and $b$ are as described following Formula I; in the presence of a catalytic quantity of a metallic hydroxide condensation catalyst, said metallic hydroxide being of a metal selected from the group consisting of alkali and alkaline earth metals.

In the above reaction variations in reaction time and reagent concentration will affect the amount of phenolic groups resulting compound. If the reaction is allowed to go to completion essentially all the hydroxyl or mercapto groups will be reacted yielding a polybenzyl ether in which the number of benzyl moieties present would be equal to the number of hydroxyl or mercapto groups present in the reactant.

If, however, it is desired to produce substantial amounts of benzyl ethers which contain one or more hydroxyl or mercapto groups on the aliphatic hydrocarbon portion, said benzyl ether should be removed prior to the reaction going to completion. Accordingly, another embodiment of this invention is the process of preparing such benzyl ethers by reacting a phenol having the formula VII. 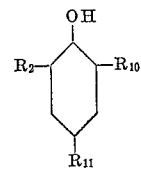

wherein $R_2$, $R_{10}$ and $R_{11}$ are as described above; with formaldehyde and a compound selected from the group consisting of polyhydric alcohols, polythiols and hydroxythiols; said compounds having the formula VIII. 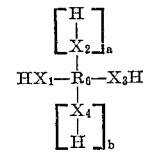

wherein $R_6$, $X_1$, $X_2$, $X_3$, $X_4$, $a$ and $b$ are as described above; in the presence of a catalytic quantity of a metallic hydroxide condensation catalyst, said metallic hydroxide being of a metal selected from the group consisting of alkali and alkaline earth metals; and removing said benzyl ether.

The various reactants employed in the above reactions are well known in the art. The aliphatic hydrocarbons containing mercapto groups used in the above reactions can be prepared from the corresponding halogenated hydrocarbon by reacting it with potassium hydrogen sulfide. Thus, 1-hydroxy-2-chloroethane can be reacted with potassium hydrogen sulfide to produce monothioethylene glycol. Likewise, 1,6-dichloro-2,4-dihydroxy-n-hexane can be reacted with potassium hydrogen sulfide to produce 1,6-dimercapto-2,4-dihydroxy-n-hexane. Also 1,2,3-trichloropropane can be reacted with potassium hydrogen sulfide to produce 1,2,3-trimercaptopropane. The preparation of other reactants used in the performance of applicant's invention will be apparent to those skilled in the art.

The above reactions can be conducted with or without a solvent by using an excess of the lower melting alcohols or thiols such as ethylene glycol or monothioethylene glycol. No solvent need be used, the thiol or alcohol itself acting both as reactant and solvent. With the higher melting thiols or alcohols such as propylene glycol or pentaerythritol a solvent should be used. In these latter reactions, stoichiometric amounts of alcohol or thiol can be used. However, in many reactions yields will be enhanced when using an excess of the alcohol.

Suitable solvents are dioxane, dimethylformamide and the higher boiling ethers such as di-n-propyl ether, ethyl-n-butyl ether, di-n-amyl ether, diisoamyl ether, di-n-hexyl ether, anisole and diphenyl ether. If pressure or lower temperatures are used, the lower boiling ethers such as diethyl ether, diisopropyl ether and methyl-n-butyl ether can also be used.

The temperatures employed with the reaction vary from about 20° C. to the reflux temperature of the highest boiling solvent or reactant, about 260° C., with reaction times of from one half hour to 2 weeks or more to give a good yield of product. A preferred temperature range is from about 70° C. to about 200° C. This temperature range gives an excellent yield of product in a convenient length of time.

The metallic hydroxide condensation catalyst is employed in catalytic quantity. This quantity ranges from about 1 to about 50 percent by weight based on the weight of the phenol used in conducting the process. Deviations from these ranges of proportions are permissible, particularly when an excess of alcohol is employed. The alkali metal hydroxide catalysts include lithium hydroxide, sodium hydroxide, potassium hydroxide, rubidium hydroxide and cesium hydroxide. The alkaline earth metallic hydroxides used as catalysts in the process of this invention include magnesium hydroxide, calcium hydroxide, strontium hydroxide and barium hydroxide. Mixtures of these catalysts can be used, especially mixtures of a plurality of alkali metal hydroxides or alkaline earth metal hydroxides. Of the foregoing hydroxides, sodium hydroxide, potassium hydroxide and calcium hydroxide are readily available at low cost and are preferably used.

To obtain the elevated temperatures sometimes necessary in the reaction, elevated pressure may be used. However, with most reactants atmospheric pressure is sufficient. Vacuum may be used when isolating the product such as when stripping the solvent. The product can be isolated by other means as well, such as by extraction with organic solvents. The reactions can be conducted either in the presence of air or under an inert atmosphere such as nitrogen. Good results are obtained by either method.

The following examples, in which all parts are by weight, illustrate the compounds of this invention and their preparation according to the method outlined above.

*Example 1*

To a reaction vessel equipped with stirring means, heating means, temperature measuring means, reactant introducing means, gas inlet and outlet tubes and a nitrogen source were added a mixture of 139 parts of ethylene glycol and 1.4 parts of potassium hydroxide. The mixture was stirred and the reaction vessel was flushed with nitrogen. To this mixture was added 10.4 parts of paraformaldehyde followed by 51.5 parts of 2,6-di-tert-butylphenol. The mixture was heated with stirring at 35–40° C. for ½ hour, after which it was heated to 70–75° C. and stirred at that temperature for 4 hours. The temperature was then maintained at 75–80° C. without stirring for 16 hours, after which time the mixture was allowed to cool. The mixture was then acidified with hydrochloric acid and diluted with benzene. An organic and an inorganic layer were present. The organic layer was mechanically separated, washed twice with water and dried in vacuo. The residue was taken up in n-pentane and upon standing a solid precipitated. The solid was removed by filtration, triturated with hot iso-octane, filtered and dried to give white, solid bis(3,5 - di - tert - butyl-4-hydroxybenzyloxy) ethane, M.P. 147–9° C. Analysis: Calculated for

$C_{32}H_{50}O_4$ 77.1 percent carbon; 10.1 percent hydrogen. Found: 76.8 percent carbon; 10.1 percent hydrogen. Infrared spectrum supported the structure.

In the above reaction, the n-pentane mother liquor was allowed to stand after filtration of the bis(3,5-di-tert-butyl-4-hydroxybenzyloxy)ethane. Additional solids precipitated which were filtered and recrystallized from n-pentane to give a crystalline solid, 3,5-di-tert-butyl-4-hydroxybenzylhydroxyethane, M.P. 79–80° C. Calculated for $C_{17}H_{28}O_3$: 72.8 percent carbon, 10.6 percent hydrogen. Found: 73.0 percent carbon, 10.2 percent hydrogen. Infrared spectrum supported the structure.

Good results are also obtained when other phenols are reacted with polyhydric alcohols in the above manner. Thus, 2-tert-butyl-6-methylphenol can be reacted with formaldehyde and ethylene glycol to yield bis(3-tert-butyl-4-hydroxy-5-methylbenzyloxy)ethane. Likewise, 2,6-diisopropylphenol can be reacted with formaldehyde and ethylene glycol in the above manner to produce bis(4-hydroxy-3,5 - diisopropylbenzyloxy)ethane. Also 2 - tert - butyl-5-methylphenol can be reacted with formaldehyde and monothioethylene glycol to produce (3-tert-butyl-4-hydroxy - 5 - methylbenzylthio) - (3 - tert - butyl - 4 - hydroxy - 5 - methylbenzyloxy)ethane. Further, monothioethylene glycol can be reacted with 2-sec-butyl-6-methylphenol and formaldehyde to produce (3-sec-butyl-4-hydroxy - 5 - methylbenzyloxy) - (3 - sec - butyl - 4 - hydroxy-5-methylbenzylthio)ethane. The above procedure can also be used to prepare bis[3-n-heptyl-4-hydroxy-5-(3-undecyl)benzyloxy]ethane from the reaction of ethylene glycol, formaldehyde and 2-n-heptyl-6-(3-undecyl)phenol.

*Example 2*

In a pressure vessel equipped with heating means, stirring means and temperature measuring means are placed 240 parts of 2-tert-amyl-6-(2-nonyl)phenol, 60 parts of paraformaldehyde, 24 parts of sodium hydroxide and 78 parts of monothioethylene glycol. The pressure vessel is sealed, the mixture is heated to 200° C. and stirred at that temperature for 4 hours after which time it is allowed to cool. The mixture is acidified with hydrochloric acid and diluted with benzene. An organic and inorganic layer are present. The organic layer is mechanically separated, washed with water, and dried in vacuo. The residue is taken up in n-hexane and upon standing a solid precipitates. This solid is removed by filtration and dried to yield 3 - tert - amyl - 4 - hydroxy - 5 - (2 - nonyl)benzylthiohydroxyethane.

Good results are also obtained when other phenols are reacted with polyhydric alcohols as above. For example, 2-(3-dodecyl)-6-n-octylphenol can be reacted with monothioethylene glycol and formaldehyde to produce 3-(3-dodecyl) - 4-hydroxy-5-n-octylbenzylthiohydroxyethane. Likewise, 2-benzyl-6-methylphenol can be reacted with formaldehyde and monothioethylene glycol to prepare 3 - benzyl - 2 - hydroxy-5-methylbenzylthiohydroxyethane. Further, 2-benzyl-6-cyclohexylphenol can be reacted with formaldehyde and 1,6-dimercapto-2,4-dihydroxy-n-hexane to prepare 1,6-bis(3-benzyl-5-cyclohexyl-2-hydroxybenzylthio) - 2,4 - dihydroxy-n-hexane. Similarly, 1,2,5-trimercapto - 4 - hydroxy-n-pentane can be reacted with formaldehyde and 2-(2-hexyl)-6-(1-naphthyl)phenol to produce 1,2,5-tris[3-(2-hexyl)-4-hydroxy-5 - (1-naphthyl)benzylthio]-4-hydroxy-n-pentane. Also 1-hydroxy-2,2-dihydroxymethyl-n-butane can be reacted with formaldehyde and 2-($\alpha,\alpha$ - diethylbenzyl)-6-n-octylphenol to prepare 1-[3-($\alpha,\alpha$-diethylbenzyl)-2-hydroxymethyl-5-n-octylbenzyloxy]-2,2-dihydroxy-n-butane.

*Example 3*

To a reaction vessel equipped with stirring means, heating means, temperature measuring means, reactant introducing means, gas inlet and outlet tubes and a nitrogen source is added a mixture of 200 parts of monothioethylene glycol and 34.6 parts of calcium hydroxide. The mixture is stirred and the reaction vessel is flushed with nitrogen. To this mixture is added 60 parts of formaldehyde followed by 346 parts of 2-(4-dodecyl)-6-n-hexylphenol. The mixture is heated with stirring to 70° C. and stirred at that temperature for 48 hours, after which it is allowed to cool. The mixture is acidified with hydrochloric acid and diluted with toluene. An organic and an inorganic layer are present. The organic layer is mechanically separated, washed twice with water and dried in vacuo. The residue is taken up in n-pentane and upon standing a solid precipitates. The solid is removed by filtration to give 3-(4-dodecyl)-5-n-hexyl-4-hydroxybenzyloxymercaptoethane.

Good results are also obtained when other phenols are reacted with polyhydric alcohols as above. For example, monothioethylene glycol can be reacted with formaldehyde and 2 - (α - ethyl-α-methylbenzyl) - 6 - (2-undecyl)phenol to prepare 3-(α-ethyl-α-methylbenzyl)-2-hydroxy-5-(2-undecyl)benzyloxymercaptoethane. Similarly, 2 - (α - methylbenzyl)-6-n-butylphenol can be reacted with formaldehyde and 1,4-dihydroxy-2-hydroxymethyl-3-mercaptomethyl-n-butane to prepare 1,4 - bis[3 - (α-methylbenzyl)-5-n-butyl-2-hydroxybenzyloxy] - 2 - hydroxymethyl-3-mercaptomethyl-n-butane. Also, 1 - hydroxy-6-mercapto-n-hexane can be reacted with formaldehyde and 2-cyclooctyl - 6 - n-heptylphenol to yield 1-(3-cyclooctyl-5-n-heptyl-2-hydroxybenzyloxy) - 6 - mercapto-n-hexane.

*Example 4*

In a reaction vessel equipped with heating means, stirring means and temperature measuring means are placed 412 parts of 2,6-di-tert-butylphenol, 120 parts of paraformaldehyde, 20.6 parts of lithium hydroxide and 620 parts of ethylene glycol. The mixture is heated to 260° C. and stirred at that temperature for ½ hour after which time it is allowed to cool. The mixture is acidified with hydrochloric acid and diluted with benzene. An organic and an inorganic layer are present. The organic layer is mechanically separated, washed with water and dried in vacuo. The residue is taken up in iso-octane and cooled below room temperature during which a solid precipitates. This solid is removed by filtration and dried to yield 3,5 - di-tert-butyl-4-hydroxybenzyloxyhydroxyethane.

Good results are also obtained when other phenols are reacted with polyhydric alcohols in the above manner. For example, 2-tert-butyl-6-methylphenol can be reacted with ethylene glycol and formaldehyde to yield 3-tert-butyl - 4 - hydroxy - 5 - methylbenzyloxyhydroxyethane. Also, 2,6-diisopropylphenol can be reacted with formaldehyde and ethylene glycol to yield 4-hydroxy-3,5-diisopropylbenzyloxy hydroxyethane. Similarly, 2,6 - di-tert-butylphenol can be reacted with 1,2-dimercaptoethane and formeldehyde to yield 3,5-di-tert-butyl-4-hydroxybenzylthiomercaptoethane. Further, 2,6 - dicyclopentylphenol can be reacted with ethylene glycol to yield 3,5-dicyclopentyl-2-hydroxybenzyloxyhydroxyethane.

*Example 5*

In a reaction vessel equipped with stirring means, heating and cooling means, temperature measuring means, reactant introducing means, gas inlet and outlet tubes and a nitrogen source are added a mixture of 94 parts 1,2-dimercaptoethane and 82.4 parts of magnesium hydroxide. The mixture is stirred and the reaction vessel is flushed with nitrogen. To this mixture is added 60 parts of formaldehyde followed by 412 parts of 2,6-di-tert-butylphenol. The mixture is maintained at 20° C. for 2 weeks with stirring. It is then acidified with hydrochloric acid and diluted with benzene. An organic and an inorganic layer are present. The organic layer is mechanically separated, washed with water and dried in vacuo. The residue is taken up in n-hexane and cooled below room temperature whereupon a solid precipitates. The solid is removed by filtration to give bis(3,5-di-tert-butyl-4-hydroxybenzylthio)ethane.

The above procedure can be used to prepare other compounds from the reaction of a polyhydric alcohol, phenol and formaldehyde. For example, ethylene glycol can be similarly reacted with formaldehyde and 2-p-ethylphenyl-6-n-propylphenol to yield bis(4 - hydroxy-3-p-ethylphenyl - 5 - n-propylbenzyloxy)ethane. Likewise, 1, 3-dihydroxy - 2 - mercaptomethyl-n-propane can be reacted with formaldehyde and 2,6-dibenzylphenol to yield 1,3 - bis(3,5 - dibenzyl-4-hydroxybenzyloxy)-2-(3,5-dibenzyl - 4 - hydroxybenzylthio)-2-(3,5 - dibenzyl-4-hydroxybenzylthiomethyl)-n-propane. Also, 1,3-dihydroxy-n-propane can be reacted with formaldehyde and 2-p-n-amylphenyl - 6 - p-n-nonylphenylphenol to yield 1,3-bis(3 - p - n - amylphenyl-5-p-n-nonylphenyl-4-hydroxybenzyloxy)-n-propane. Similarly, 1,3-dihydroxy - 2,2-dihydroxymethyl - n - propane can be reacted with 2,6-di-p-n-hexylphenylphenol and formaldehyde to yield 1,3-bis(3,5-di-p-n-hexylphenyl - 4 - hydroxybenzyloxy)-2,2-bis(3,5 - di-p-n-hexylphenyl-4-hydroxybenzyloxymethyl)-n-propane. Further, 1,2,3-trimercapto-5-hydroxy-n-pentane can be reacted with formaldehyde and 2-(α,α-dimethylbenzyl-6-n-decylphenol to prepare 1,2,3-tris[3-(α,α - dimethylbenzyl) - 5 - n - decyl-4-hydroxybenzylthio]-5-[3-(α,α-dimethylbenzyl)-5-n-decyl - 4 - hydroxybenzyloxy]-n-pentane. Also, 1,2,3,4 - tetramercapto-n-butane can be reacted with 2-p-methylphenyl-6-p-n-nonylphenylphenol and formaldehyde to yield 1,2,3,4-tetrakis(4-hydroxy-3-p-methylphenyl-5-n-nonylbenzylthio) - n - butane.

*Example 6*

In a reaction vessel equipped with heating means, stirring means and temperature measuring means are added a mixture of 204 parts of 2-cyclohexyl-6-ethylphenol, 30 parts of paraformaldehyde, 10.2 parts of potassium hydroxide and 600 parts of 1,2-dimercaptoethane. The mixture is heated to 150° C. and stirred at that temperature for 8 hours after which it is allowed to cool. The mixture is acidified with hydrochloric acid and diluted with toluene. An organic and an inorganic layer are present. The organic layer is mechanically separated, washed with water and dried in vacuo. The residue is taken up in n-pentane and upon standing a solid precipitates. The solid is removed by filtration to give bis-(3-cyclohexyl-5-ethyl-4-hydroxybenzylthio)ethane.

Good results are also obtained when other phenols are reacted with polyhydric alcohols as above. For example, 1,2,3-trihydroxy-4-mercapto-n-butane can be reacted with 2-(p-ethylbenzyl)-6-(p-n-propylbenzyl)phenol and formaldehyde to yield 1,2,3-tris[3-(p-ethylbenzyl)-4-hydroxy-5 - (p - n - propylbenzyl)benzyloxy] - 4 - [3 - (p - ethylbenzyl) - 4 - hydroxy - 5 - (p - n - propylbenzyl)benzylthio]-n-butane. Likewise 1,2,3-trihydroxypropane can be reacted with formaldehyde and 2,6-di-n-dodecylphenol to give 1,2,3 - tris(3,5 - di - n - dodecyl - 2 - hydroxybenzyloxy)-n-propane. Similarly, 2-n-amyl-6-cycloheptylphenol can be reacted with formaldehyde and 1-hydroxy-4-mercaptobutane to prepare 1 - (3 - n - amyl - 5 - cycloheptyl-2 - hydroxybenzyloxy) - 4 - (3 - n - amyl -5 - cycloheptyl-2-hydroxybenzylthio)butane. Further, 1,2,3-trimercapto-n-propane can be reacted with formaldehyde and 2,6-dicyclooctylphenol to yield 1,2,3-tris(3,5-dicyclooctyl-2-hydroxybenzylthio)-n-propane. In similar manner, 1,2-bis-(3 - m - n - heptylphenyl - 4 - hydroxy - 5 - o - n - octylphenylbenzyloxy)-n-propane can be prepared from the reaction of formaldehyde, 1,2-dihydroxy-n-propane and 2-m-n-heptylphenyl-6-o-n-octylphenylphenol.

The compounds of this invention have many important advantages over apparently similar compounds. In the first place they are highly effective antioxidants. Secondly, they are compatible with a wide variety of organic media. Thirdly, they are non-staining and non-discoloring; that is, the use of these compounds as antioxidants do not impart to the medium in which they are used any discoloration or staining resulting from either the oxidized form of the compound or the reaction product of the oxidized form and the media. This latter problem of discoloration and staining has plagued industries such as the rubber industry and plastics industry for many years. While many compounds are effective antioxidants, discoloration and staining attendant with their use precludes their commercial acceptance in many areas where the final product must possess defined coloring.

A further property of applicant's compounds and a most important one is the fact that they possess low volatility. In formulating organic compositions, for example in the rubber and plastics industries as well as in the food industry, the medium to be protected is subjected to extremes of temperature and pressure such as vulcanizing of rubber, extrusion of plastics and cooking of cereals. Often the oxidation to be protected against occurs during the processing. Accordingly, an antioxidant to be effectively used must not be lost under these conditions. Volatility of the additive plays a major part in such utility. Applicant's compounds, which have a low volatility, are perfectly suited for such applications.

Thus applicant has solved not just one problem but a three-fold problem. I have provided not only an antioxidant but one which is non-discoloring and non-staining and also has low volatility. A particular industry where all three properties are absolutely critical is the rubber industry. In the vulcanization of rubber the additive must be added during the vulcanization process to protect the rubber from unwanted oxidation. Thus, the compound must not only possess high antioxidant capability but low volatility is crucial so as to retain the antioxidant in the final product. Further, compounds which are antioxidants and have low volatility are useless if they discolor or stain. Applicant's compound, as noted above, does not discolor and does not stain. Accordingly, applicant's compounds have achieved a balance of properties which are indeed unique in the antioxidant area.

As noted above, the compounds of this invention are outstanding antioxidants. Therefore, an embodiment of this invention is a new composition of matter which comprises organic material normally tending to undergo oxidative deterioration in the presence of air, oxygen or ozone containing an appropriate quantity—from 0.001 up to about 5 percent, and preferably from about 0.10 to about 2 percent—of a compound of this invention.

The compounds of this invention find important utility as antioxidants in a wide variety of oxygen-sensitive material. Thus liquid hydrocarbon fuels such as gasoline, kerosene and fuel oil are found to possess increased storage stability by the use of a compound of this invention. Likewise, liquid hydrocarbon fuels such as gasoline which contain organometallic additives such as tetraethyllead as well as other organometallic compounds which are used as fuel additives attain appreciably increased oxidative stability by the practice of this invention. In addition, lubricant oils and functional fluids, both those derived from naturally occurring hydrocarbons and those synthetically prepared are greatly enhanced by the practice of this invention. The addition of small quantities of the compounds of this invention to such materials as turbine, hydraulic, transformer and other highly refined industrial oils, soaps and greases; plastics; synthetic polymers such as polyethylene and polypropylene; organometallic compositions where such fluids contain tetraethyllead and tetraethyllead antiknock mixtures as well as other organometallics; elastomers, including natural rubber; lubricating greases; crankcase lubricating oils; and the like, greatly increase resistance to deterioration in the presence of air, oxygen or ozone.

The compounds of this invention are also very useful in protecting petroleum wax—paraffin wax and microcrystalline wax—against oxidative deterioration. They also find use in the stabilization of edible fats and oils of animal and vegetable origin which tend to become rancid, especially during long periods of storage because of oxidative deterioration. Typical representatives of these edible fats and oils are linseed oil, cod liver oil, castor oil, soy bean oil, rape seed oil, coconut oil, olive oil, palm oil, corn oil, seseme oil, peanut oil, babassu oil, butter fat, lard, beef tallow, and the like.

The compounds of this invention are very effective antioxidants for high molecular weight unsaturated hydrocarbon polymers, such as polybutadiene, methyl rubber, polybutene rubber, natural rubber, butyl rubber, GR-S rubber, GR-N rubber, piperylene rubber, dimethyl butadiene rubber and the like. Thus a preferred embodiment of the present invention is a rubber containing as an antioxidant therefor, a compound of this invention as defined above. Another part of this invention is the method of preserving rubber which comprises incorporating therein a compound of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.001 to about 5 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadiene-styrene (GR-S) and butadiene-acrylonitrile (GR-N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the stabilizers are relatively inexpensive and easily prepared, and possess the highly beneficial property of low volatility. As noted above, a highly desirable feature of a rubber antioxidant is that it has a low volatility so that it remains admixed with the rubber during vulcanization and related process steps.

The present invention will be still further apparent from the following specific examples wherein all parts and percentages are by weight.

*Example 7*

To a synthetic rubber master batch comprising 100 parts of GR-S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of bis(3,5-di-tert-butyl-4-hydroxybenzyloxy)ethane. This batch is then cured for 60 minutes at 45 p.s.i. of steam pressure.

*Example 8*

One percent of 3,5-di-tert-butyl-4-hydroxybenzyloxyhydroxyethane is added to a synthetic rubber master batch comprising 100 parts of GR-S rubber having an average molecular weight of 100,000, 5 parts of zinc stearate, 50 parts of carbon black, 5 parts of road tar, 2 parts of sulfur and 1.5 parts of mercaptobenzothiazole. This batch is then cured as described in Example 7.

*Example 9*

Two parts of 3-tert-butyl-4-hydroxy-5-methylbenzyloxyhydroxyethane are incorporated in 100 parts of raw butyl rubber prepared by the copolymerization of 90 percent of isobutylene and 10 percent of isoprene.

*Example 10*

To 200 parts of raw butyl rubber prepared by copolymerization of 95 percent of isobutylene and 5 percent of butadiene is added 5.0 parts of bis(3-tert-butyl-4-hydroxy-5-methylbenzyloxy)ethane.

Example 11

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 2.0 percent based on the weight of the batch of 4-hydroxy-3,5-diisopropylbenzyloxy hydroxyethane.

Example 12

To natural rubber (Hevea) is added 0.10 percent of bis(4-hydroxy-3,5-diisopropylbenzyloxy)ethane.

Example 13

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 3,5-di-tert-butyl-4-hydroxybenzylthio-mercaptoethane | 4 |
| Benzothiazyl disulfide | 0.4 |
| Amine activator | 0.5 |

This stock is then vulcanized for 60 minutes at 280° F.

Example 14

A butadiene-acrylonitrile copolymer is produced from butadiene-1,3 and 32 percent of acrylonitrile. Two percent (based on the dry weight of the copolymer) of bis(3-tert-butyl-4-hydroxy-5-methylbenzylthio)ethane is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Example 15

Three percent of 3-tert-amyl-4-hydroxy-5-(2-nonyl)benzylthiohydroxyethane emulsified in sodium oleate is added to a rubber-like, copolymer of butadiene-1,3 and styrene containing 25 percent of combined styrene.

Example 16

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 0.001 part of 1,2,3,4-tetrakis(4-hydroxy-3-p-methylphenyl-5-n-nonylbenzylthio)-n-butane. The stock so compounded is cured by heating for 45 minutes at 126° C. in a press.

Each of the above illustrative rubber compositions of this invention possesses greatly improved resistance against oxidative deterioration as compared with the corresponding rubber compositions which are devoid of an antioxidant. Moreover, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

To illustrate the enhanced oxygen resistance of the rubber compositions of this invention and the excellent non-staining and non-discoloration characteristics of the compounds of this invention a light colored stock is selected for test. This stock has the following composition.

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of bis(3,5-di-tert-butyl-4-hydroxybenzyloxy)ethane and individual samples are cured for 20, 30, 45 and 60 minutes at 274° C. using perfectly clean molds with no mold lubricant. Another set of samples of the same base formula which does not contain an antioxidant is cured under the same conditions.

To demonstrate the protection afforded to the rubber by bis(3,5-di-tert-butyl-4-hydroxybenzyloxy)ethane and to contrast the same with inhibitor-free stocks, the tensile strength and the ultimate elongation of the test specimens are determined before and after aging. The aging is accomplished by conducting the procedure of ASTM Designation: D–572–52, described in the ASTM Standards for 1952, part 6, for a period of 168 hours at a temperature of 70° C. with an initial oxygen pressure in the test bomb of 300 p.s.i.

The tensile strength and the ultimate elongated of the test specimens before and after againg are measured by ASTM Test Procedure, D–412—51T (ASTM Standards for 1952, part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occurred during the accelerated aging. This is a direct measure of the oxygen uptake of the samples and provides an other criterion of the effectiveness of an inhibitor in suppressing oxidative deterioration of the rubber. Thus, the larger the weight increase, the greater is the deterioration and the less effective is the inhibitor.

The results of these tests show that bis(3,5-di-tert-butyl-4-hydroxybenzoyloxy)ethane is a superior rubber antioxidant.

Furthermore, on exposure to ultraviolet light in the weatherometer, it is noted that the typical composition of this invention posssesses essentially no discoloration.

The amount of inhibitor employed in the rubber compositions of this invention varies from about 0.001 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress, and the like, the use of relatively high concentrations of this inhibitor is advantageous. On the other hand, when the article of manufacture is not to be subjected to such severe conditions, relatively low concentrations can be successfully utilized. Generally speaking, amounts ranging from about 0.1 to about 2 percent by weight give uniformly satisfactory results.

Other rubbers and elastomers which can be preserved according to this invention are the rubbery polymerizates of isoprene, butadiene-1,3, piperylene; also the rubber co-polymer of conjugated dienes with one or more polymerizable monoolefinic compounds which have the capability of forming rubbery co-polymers with butadiene-1,3, outstanding examples of such monoolefinic compounds being those having the group CH$_2$=C, exemplified by styrene. Examples of such monoolefins are styrene, vinyl naphthalene, alpha methyl styrene, para-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl-substituted vinyl pyridines, etc. In fact, excellent stabilization is achieved by incorporating a compound of this invention in any of the well-known elastomers which are normally susceptible to deterioration in the presence of air, such as elastoprenes, elastolenes, elastothiomers, and elastoplastics.

The compounds of this invention are also useful in preventing oxidative deterioration in lubricating oil compositions. Thus, an embodiment of this invention is a lubricating oil normally susceptible to oxidative deterioration and a small antioxidant quantity, up to 5 percent, of a compound of this invention as defined above.

To prepare the lubricants of this invention an appropriate quantity—from about 0.001 to about 5 percent and preferably from about 0.10 to about 2 percent—of a compound of this invention is blended with the base oil to be protected. Suitable base oils include mineral oils and also synthetic diester oils such as sebacates, adipates, etc., which find particular use as aircraft instrument oils, hydraulic and damping fluids and precision bearing lubricants. All of these base oils are normally susceptible to oxidative deterioration, especially at elevated temperatures. The finished lubricants of this invention have much greater oxidation stability and many other improved performance characteristics as compared with the corresponding base oils.

To illustrate the useful antioxidant properties of the novel products of this invention, polyveriform oxidation stability tests were conducted. The polyveriform oxidation test is described in the paper entitled, "Factors Causing Lubricating Oil Deterioration in Engines," Ind. and Eng. Chem., Anal. Ed., 17, 302 (1945). See also, "A Bearing Corrosion Test for Lubricating Oils and Its Correlation With Engine Performance," Anal. Chem., 21, 737 (1949). This test effectively evaluates the performance of lubricating oil antioxidants. The test equipment procedure employed and correlations of the results with engine performance are discussed in the first paper above cited. By employing various products of this invention in oxygen-sensitive lubricating oil, effective inhibition of oxidative deterioration is achieved.

The comparative tests were conducted using the method and apparatus essentially as described in the publication first above mentioned. One minor modification was that the steel sleeve and copper test piece described in this publication were omitted from the apparatus. In these tests an initially additive-free, 95 V.I. solvent-refined SAE-10 crankcase oil was used. The principal conditions consisted of passing 48 liters of air per hour through the test oil for a total period of 20 hours while maintaining the oil at a temperature of 300° C. Oxidative deterioration of the oil was further promoted by employing as oxidation catalysts 0.05 percent by weight of ferric oxide (as ferric 2-ethylhexoate) and 0.10 percent by weight of lead bromide, both of these amounts being based upon the weight of oil employed. Lubricating oils were prepared by blending individual portions of the above lubricating oil with 1 percent by weight of bis(3,5-di-tert-butyl-4-hydroxybenzyloxyethane and 1 percent by weight of 3,5-di-tert-butyl-4-hydroxybenzyloxyhydroxyethane. These compositions were then subjected to the above stringent oxidation test. In addition to the foregoing examples an additional test specimen was formulated consisting of the additive-free crankcase oil described above and one weight percent of 2,6-di-tert-butyl-α-methoxy-p-cresol. This compound is quite similar to applicant's compound in that on the one hand the first compound named above is essentially a "dimer" of this compound. The second compound named above differs only by the presence of a hydroxyl group. These differences, as will be noted in the results, turn out to be quite critical. Thus the similarity between applicant's compounds and 2,6-di-tert-butyl-α-methoxy-p-cresol is only one of structure and not of affect. The results of these tests are shown in Table I.

TABLE I.—EFFECT OF PRODUCTS OF THIS INVENTION ON THE OXIDATION OF LUBRICATING OIL

| Additive | Additive Conc., percent by weight | Viscosity Increase at 100° F., percent |
| --- | --- | --- |
| None | | 173 |
| Bis(3,5-di-tert-butyl-4-hydroxybenzyloxy)ethane | 1.0 | 72 |
| 3,5-di-tert-butyl-4-hydroxybenzyloxy-hydroxyethane | 1.0 | 60 |
| 2,6-di-tert-butyl-α-methoxy-p-cresol | 1.0 | 117 |

By referring to the data presented in Table I, it is immediately apparent that the products of this invention effectively inhibit the oxidative deterioration of lubricating oil. While 2,6-di-tert-butyl-α-methoxy-p-cresol does effectively lower the percent viscosity increase of the test oil, it only does so by 32 percent, whereas applicant's compounds lower the viscosity increase by 58 and 65 percent. Thus applicant's compounds are almost two times as effective as a very similar compound. This similar compound is a commercial antioxidant itself and is the subject of U.S. Patent No. 2,838,571 granted to applicant's assignee. This result is even more startling when it is considered that the test was conducted on a weight percentage basis. There are substantially as many "phenolic groups" in the test samples containing applicant's compounds as in the test sample containing the compared compound.

The following examples illustrate lubricating oil compositions of this invention.

*Example 17*

To 1,000 parts of a solvent refined neutral oil 95 V.I. and 200 SUS at 100° F. containing 6 percent of a commercial methacrylate Type VI approver which gives the finished formulation of a V.I. of 140 and a viscosity of 300 SUS at 100° F. is added 5 percent of 1-[3-(α,α-diethylbenzyl) - 2 - hydroxy - 5 - n-octylbenzyloxy]-2,2-dihydroxy-n-butane.

*Example 18*

To an additive-free solvent refined crankcase lubricating oil having a viscosity index of 95 and an SAE visocity of 10 is added 0.001 percent of 3-(α-ethyl-α-methylbenzyl)-2-hydroxy-5-(2-undecyl)benzyloxymercaptoethane.

*Example 19*

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of bis(4 - hydroxy - 3 - p-ethylphenyl-5-n-propylbenzyloxy) ethane. The resulting oil possesses greatly enhanced resistance to oxidative deterioration.

*Example 20*

To 100,000 parts of a commercially available pentaerythritol ester having a viscosity at 100° F. of 22.4 centistokes, and known in the trade as "Hercoflex 600" is added 400 parts (0.4 percent) of bis(3-cyclohexyl-5-ethyl-4-hydroxybenzylthio)ethane. The resulting finished oil possesses markedly improved resistance against oxidative deterioration.

*Example 21*

To 100,000 parts of dioctyl sebacate having a viscosity of 210° F. of 36.7 SUS, a viscosity index of 159 and a molecular weight of 426.7 is added 250 parts (0.25 percent) of 3-benzyl-2-hydroxy-5-methylbenzylthiohydroxyethane.

The products of this invention are also useful as additives to functional fluids and automatic transmission fluids. The primary constituent of a functional fluid is a refined mineral lubricating oil having a carefully selected minimum viscosity of 49 Saybolt Universal seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium and magnesium. The organic components contain oil solubilizing groups such as high molecular weight straight or branched chain paraffins, aromatic or naphthenic rings, or contain a halongen. These metal compounds are present in the compounded fluid in a concentration range of between about 0.1 to about 5 percent by weight. These compounds include alkaline earth metal salts or phenyl-substituted long chain fatty acids, alkaline earth metal salts of the capryl or octyl esters of salicylic acid, the alkaline earth metal salts of petroleum sulfonic acids, the alkaline earth metal salts of alkyl-substituted phenol sulfides, the salt of aluminum or the alkaline earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline earth metal oxide or hydroxide at an elevated temperature. The overbased phenate formed from the reaction contains up to two or three times as much metal as the normal phenate.

In addition, functional fluids may contain additional components which improve the properties of the fluid. Typical components include anti-squawk additives, pour point depressants, foam inhibitors, rust preventatives, extreme pressure agents, metal deactivators and viscosity index improvers.

The following examples show typical functional fluids of this invention. The fluids are formed by mixing the ingredients together, while heating the oil to a temperature up to 200° F.

*Example 22*

A fluid of this invention is prepared by blending 80 parts of a conventionally-refined Pennsylvania mineral oil (99 SUS at 100° F.), 2 parts 1,2-bis(3-m-n-heptylphenyl - 4 - hydroxy - 5 - o-n-octylphenylbenzyloxy)-n-propane, 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

*Example 23*

Another such fluid consits of 95 parts of a solvent refined, light acid-treated, clay-contacted, solvent dewaxed paraffin base distillate mineral oil (110 SUS at 100° F.); 0.1 part of 3-sec-butyl-4-hydroxy-5-methylbenzyloxy-3'-sec-butyl-4'-hydroxy-5'-methylbenzylthioethane; 0.1 part of calcium octylphenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity of 60/60° F. of 0.875.

Liquid hydrocarbon fuels employed in the operation of spark ignition combustion engines are also vastly improved in their storage stability by the practice of this invention. Table II, below, gives the compositions of a number of typical commerical gasolines which may be stabilized against oxidative deterioration by the inclusion therein of a product of this invention.

TABLE II.—GASOLINE COMPOSITIONS

| Gasoline | Percent Aromatics | Percent Olefins | Percent Saturates | Gravity, ° API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

*Example 24*

To 1,000 parts of Gasoline A, as described in Table II, is added 10 parts of 3-(4-dodecyl)-5-n-hexyl-4-hydroxybenzyloxymercaptoethane.

*Example 25*

To 10,000 parts of Gasoline B is added 50 parts of bis [3-n-heptyl-4-hydroxy-5-(3-undecyl)benzyloxy]ethane.

*Example 26*

To 500 parts of Gasoline C, as described in Table II, is added 10 parts of 1-(3-cyclooctyl-5-n-heptyl-2-hydroxybenzyloxy)-6-mercapto-n-hexane.

*Example 27*

To 2,000 parts of Gasoline D is added 15 parts of 1,2,3-tris[3 - (α,α-dimethylbenzyl)-5-n-decyl-4-hydroxybenzylthio] - 5 - [3-(α,α-dimethylbenzyl)-5-n-decyl-4-hydroxybenzyloxy]-n-pentane.

*Example 28*

To 10,000 parts of Gasolne E is added 500 parts of 1,3-bis(3-p-n-amylphenyl - 5-p-n-nonylphenyl-4-hydroxybenzyloxy)-n-propane.

Antiknock compositions and spark ignition internal combustion engine fuels containing mixtures of organolead antiknock agents and cyclopentadienyl manganese tricarbonyls are also vastly improved in their storage stability by the practice of this invention. Such compositions are described more fully in U.S. Patent No. 2,818,417.

Despite their great general stability cyclopentadienyl manganese tricarbonyls accelerate and in some cases cause deterioration of leaded gasolines containing them. Research has shown that cyclopentadienyl manganese tricarbonyls serve as deterioration catalysts but the manner by which they exert this adverse effect cannot presently be explained. All available evidence indicates that the manganese compounds catalyze the simultaneous deterioration of the organolead antiknock agent and the base fuel. This results in the premature formation of organolead decomposition products (both soluble and insoluble) and gum and other sludges resulting primarily from the fuel deterioration. In addition, the amounts of these decomposition products are ultimately increased. Hence, the problem is a combination of increased rate of deterioration and increased extent of deterioration.

The problem is not merely the conventional one of providing protection against the oxidative deterioration of clear gasolines or of leaded gasolines. For instance, a number of powerfully effective antioxidants of proven ability to stabilize clear and leaded gasolines have been found to fail completely when used in an attempt to overcome this problem. In fact, after much research it has been found that prior concepts of gasoline and gasoline additive stabilization are of no help whatsoever in seeking to find a solution to this complex problem.

As a further illustration of the unique character of this problem, it has been found that a widely used metal deactivator—N,N'-disalicylidene - 1,2-diaminopropane— affords no relief whatsoever from the present problem. In fact, the metal deactivator actually further increases the amount of deterioration that occurs in manganese-containing leaded gasolines. Hence the present problem is not a simple type of metal catalyzed oxidative deterioration that can be remedied by conventional means, such as by complexing metallic fragments (produced by initial decomposition of the metallic additives) by means of a metal deactivator. It is seen that the present problem is the result of a highly complex interplay among the various ingredients (and perhaps their decomposition products) of these commercially important organolead manganese compositions.

Leaded gasolines containing a minor amount of a cyclopentadienyl manganese tricarbonyl or cyclopentadienyl nickel nitrosyl can be effectively stabilized by the presence therein of a small quantity of a compound of this invention, such as bis(3,5-di-tert-butyl-4-hydroxybenzyloxy)ethane. These compounds have been found to completely eliminate the problem at hand. In fact, in many cases, the compositions of this invention have stabilities at least as great as those of the corresponding manganese and nickel-free leaded gasolines.

In the compositions of this invention the concentrations of the prime ingredients will vary. Thus the finished fuels of this invention can contain from about 0.2 to about 6.4 grams of lead per gallon as an organolead antiknock agent. The manganese or nickel concentrations therein can range from about 0.005 to about 6 grams per gallon as a cyclopentadienyl manganese tricarbonyl or cyclopentadienyl nickel nitrosyl respectively. On a cost effectiveness basis, finished motor fuels containing per gallon from about 1 to about 4 grams of lead and from 0.05 to about 2 grams of manganese or nickel are preferred. In all of these finished fuels the concentration of the above compounds of this invention can be from about 0.002 to about 0.01 weight percent based on the fuel. Expressed in different units these concentrations correspond respectively to about 0.5 to about 25 pounds per thousand barrels of fuel. These concentrations are sufficient to inhibit the deterioration which would occur in the absence of the compounds of this invention.

In formulating finished fuels it is common practice to employ concentrated gasoline solutions of the additives. These stock solutions are then cut with or metered into the remainder of the gasoline to achieve the appropriate concentration in the finished fuel. A feature of this invention is that such concentrated stock solutions are likewise very effectively stabilized by the presence therein of a compound of this invention. Consequently, the concentrations of the above ingredients can be as much as 10 times as high as those set forth above. The choice of concentrations is within the discretion of the refiner and takes into consideration the quantities of gasoline being processed, the storage temperatures to be accounted, the length of storage involved, etc. The specific concentrations given above are for illustrative purposes only and are not to be considered as limitations upon this invention.

Another embodiment of this invention is an antiknock fluid composition adopted for use as an additive to gasoline, which composition consists essentially of an organolead antiknock agent, a cyclopentadienyl manganese tricarbonyl or cyclopentadienyl nickel nitrosyl and a compound of this invention as defined above, there being present in the composition from about 0.00078 to about 30 parts of manganese or nickel per part of lead and from about 0.1 to about 5 weight percent of a compound of this invention based on the weight of the organolead antiknock agent. These compositions possess greater stability by virtue of the presence therein of a compound of this invention. Furthermore, these compositions provide an excellent vehicle by which the finished fuels of this invention can be formulated.

The foregoing compositions of this invention can also contain other additives known in the art. Halogen scavengers for the organolead antiknock agents (ethylene dibromide and/or ethylene dichloride, etc.), corrective agents (phosphorus, arsenic and antimony compounds, etc.), dyes, solvents and/or diluents are illustrative of the types of additives which can be co-present.

To demonstrate the striking improvement resulting from this invention, storage tests are conducted, a number of fuel blends are made up using two commercially available gasolines of widely differing stabilities. Each of these base fuels are treated with tetraethyllead so that the concentration thereof is 3 ml. per gallon (3.18 gram of lead per gallon). The tetraethyllead is used in the form of commercial motor mix (tetraethyllead, 0.5 theory of ethylene dibromide and 1.0 theory of ethylene dichloride). To portions of each of these fuels is then added methylcyclopentadienyl manganese tricarbonyl to a concentration of 0.5 gram of manganese per gallon. Samples of these manganese-containing leaded fuels are then treated per this invention with residual oil No. 3 in Table III, a product of this invention. Concentrations equivalent to six pounds per one thousand barrels are used. For comparative purposes, identical samples are made up containing six pounds per one thousand barrels of a commercial antioxidant of proven ability and widely used to stabilize gasolines both clear and leaded. This additive is referred to below as "commercial additive."

The various test fuels are stored at 110° F. and periodically analyzed to determine their content of gum and soluble alkyl lead salts. The gum content is determined by the standard ASTM tests procedure D-381. The soluble alkyl lead salts are determined by extracting samples of the stored fuels with an ammonia ammonium acetate solution and assaying the amount of lead so extracted. The formation of gum and soluble alkyl lead salts is, of course, proof that decomposition of the fuel has taken place. Therefore, the relative stabilities of the test fuels are directly measured by determining the length of time required to form 7 mg. of gum per 100 ml. of fuel and 3 mg. of lead as soluble alkyl lead salts per 100 ml. of fuel. The longer the time required to form these amounts of decomposition products the more stable is the fuel compositions. In this test, fuels of this invention are stable for a substantially longer time than are fuels not containing a product of this invention.

The following examples illustrate the compositions of this invention and the methods by which they are prepared.

*Example 29*

To 1000 gallons of a commercial gasoline having a gravity of 59.0° API, an initial boiling point of 98° F. and a final boiling point of 390° F. are added 3.18 grams per gallon of lead as tetraethyllead, 0.6 theory (based on the lead) of bromine as ethylene dibromide, 1.0 theory (based on the lead) of chlorine as ethylene dichloride, 0.25 gram of manganese per gallon as methylcyclopentadienyl manganese tricarbonyl and 0.0002 weight percent (based on the gasoline) of 1,2,3-tris(3,5-dicyclooctyl-2-hydroxybenzylthio)-n-propane. The resultant fuel possesses enhanced stability characteristics.

*Example 30*

With a gasoline having an initial boiling point of 93° F., a final boiling point of 378° F., an API Gravity of 56.2° and a tetraethyllead content equivalent to 0.2 gram of lead per gallon are blended cyclopentadienyl nickel nitrosyl to a concentration of 0.05 gram of nickel per gallon and 1,3-bis(3,5-dibenzyl-4-hydroxybenzyloxy)-2-

(3,5-dibenzyl-4-hydroxybenzylthio) - 2 - (3,5-dibenzyl-4-hydroxybenzylthiomethyl)-n-propane to a concentration of 0.005 weight percent (based on the gasoline). The finished fuel so formed possesses improved stability properties.

*Example 31*

To a gasoline having an API gravity of 51.5° F., an initial boiling point of 91° F. and a final boiling point of 394° F. are blended 6.4 grams of lead per gallon as tetrabutyllead, 2 grams of manganese per gallon as octylcyclopentadienyl manganese tricarbonyl and 0.0008 weight percent (based on the gasoline) of 1,2,3-tris[3-(p-ethylbenzyl)-4-hydroxy - 5 - (p-n-propylbenzyl)benzyloxy]-4-[3-p-ethylbenzyl) - 4 - hydroxy-5-(p-n-propylbenzyl)benzylthio]-n-butane. The resultant fuel possesses very good stability.

*Example 32*

With a gasoline having an initial boiling point of 93° F. and a final boiling point of 410° F. are blended 2 grams of lead per gallon as tetraphenyllead, 6 grams of nickel as diethylcyclopentadienyl nickel nitrosyl, 1 theory (based on the lead) of bromine as ethylene dibromide and 0.01 weight percent (based on the gasoline) of 1,6-bis(3-benzyl-5-cyclohexyl-2-hydroxybenzylthio) - 2,4 - dihydroxy-n-hexane. The finished fuel has very good storage stability.

This invention also extends to the use in the above compositions of manganese pentacarbonyl (i.e., dimanganese decacarbonyl).

Saturated hydrocarbon synthetic polymers are also greatly enhanced by the practice of this invention. The saturated hydrocarbon synthetic polymers which are greatly enhanced in oxidative stability by the practice of this invention, includes polymers obtained from the polymerization of a hydrocarbon monoolefin having up to 4 carbon atoms.

Examples of such monomers include ethylene, propylene, butylene and isobutylene. Thus the polymers are homopolymers and copolymers of ethylene, propylene, butylene and isobutylene.

A preferred embodiment of this invention is polyethylene containing a small antioxidant quantity, up to about 5 percent, of a product of this invention. A particularly preferred embodiment of the invention comprises polyethylene containing from about 0.01 to about 2 percent of a product of this invention. In particular it is found that when from 0.01 to about 2 percent of bis(3,5-di-tert-butyl-4-hydroxybenzyloxy)ethane is incorporated in polyethylene compositions of outstanding oxidative stability result. This is true, in particular for bis(3,5-di-tert-butyl-4-hydroxybenzyloxy)ethane. Thus bis(3,5-di-tert-butyl-4-hydroxybenzyloxy)ethane represents an especially preferred inhibitor of this invention.

Polyethylene is a hydrocarbon polymer derived from the polymerization of ethylene. This polymerization can be accomplished by a great variety of methods which lead to products of diverse properties. Polyethylene of any nature may advantageously be utilized for preparing compositions according to the present invention. The polymers of ethylene which are employed may, for example, be similar to those which may be obtained by polymerizing ethylene in a basic aqueous medium and in the presence of polymerization-favoring quantities of oxygen under relatively high pressures in excess of 500 to 1,000 atmospheres at temperatures between 150 and 275° C. Or, if desired, they may be similar or identical to the essentially linear and unbranched polymers ordinarily having greater molecular weights which may be obtained under relatively low pressures of 1 to 100 atmospheres using such catalysts to polymerize the ethylene as mixtures of strong reducing agents and compounds of Group IV–B, V–B and VI–B metals of the Periodic System; chromium oxide and silicated alumina; hexavalent molybdenum compounds; and charcoal supported nickel-cobalt. The polyethylene which results from these various polymerization processes may have a molecular weight in the range from 1300 to over 1,000,000 depending on the particular conditions of polymerization employed.

The benefits derived from the practice of this invention are demonstrated by comparative oxidation tests of uninhibited polyethylene and polyethylene containing an antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed, and the temperature is raised to 150° C. The oxygen pressure is maintained at 1 atmosphere by means of a leveling bulb. The oxygen uptake at the elevated temperature is recorded until sharp increase in the oxygen uptake occurs. This procedure has been adopted since it has been found that many compounds may inhibit the oxidation for a certain induction period after which time a very sharp increase in the rate of oxygen uptake occurs indicating that the antioxidant has been exhausted. In tests of this nature it is found that the compositions of this invention have greatly increased the "induction periods."

There are several methods available for preparing the inhibited hydrocarbon polymer compositions of this invention. Thus, the blending of the products of this invention with a polymer such as, for example, polyethylene, may be carried out on open rolls, on internal mixers or may be accomplished by mixing with extrusion. It is also possible to prepare concentrated batches of the polymer containing excessive amounts of the products of this invention and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The products of this invention may be initially mixed with the polymer in the dried state or it may be first dissolved in a suitable solvent, then sprayed on the polymer and milled in.

Examples of the hydrocarbon polymer compositions of this invention prepared as described above follow. All parts and percentages are by weight in these examples.

*Example 33*

To 1000 parts of polyethylene produced by oxygen catalyzed reaction under a pressure of 20,000 atmospheres and having an average molecular weight of 40,000 is added and mixed 2 parts of 3-(3-dodecyl)-4-hydroxy-5-n-octylbenzylthiohydroxyethane. The resulting composition has greatly increased oxidative stability.

*Example 34*

With 200 parts of polyisobutylene having an average molecular weight of 100,000 is blended 1.0 part bis(3,5-di-tert-butyl-4-hydroxybenzylthio)ethane.

*Example 35*

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 3,5-dicyclopentyl-2-hydroxybenzyloxyhydroxyethane.

Example 36

A linear polyethylene having a high degree of crystallinity (about 93 percent) and below 1 ethyl-branched chain per hundred carbon atoms, a density of about 0.96 gram per milliliter and which has about 1.5 double bonds per hundred carbon atoms is treated with $50 \times 10^{-6}$ roentgens of β-radiation. To the thus irradiated polymer is added 0.005 percent 1,4-bis[3-(α-methylbenzyl)-5-n-butyl-2 - hydroxybenzyloxy]-2-hydroxymethyl-3-mercaptomethyl-n-butane and the resulting product has better stability characteristics.

Example 37

To a polyethylene having an average molecular weight of 1500, a melting point of 88–90° C. and a specific gravity of 0.92 is added 1 percent of 1,2,3-tris(3,5-di-n-dodecyl-2-hydroxybenzyloxy)-n-propane. After milling in the antioxidant an extremely oxidation-resistant product results.

Example 38

Two parts of 3,5-di-tert-butyl-4-hydroxybenzyloxyhydroxyethane are added with milling to 100 parts of a low density polyethylene prepared by high pressure polymerization and which has an average molecular weight of about 20,000. The resulting product is vastly improved in its oxidative stability.

Example 39

To 10,000 parts of a polyethylene having an average molecular weight of about 100,000 and which has a tensile strength of 5400 p.s.i., a Shore D hardness of 70 and a softening temperature of 130° C. under low load is added 10 parts 1-(3-n-amyl-5-cycloheptyl-2-hydroxybenzyloxy) - 4 - (3 - n - amyl - 5 - cycloheptyl - 2 - hydroxybenzylthio)butane to prepare a composition of outstanding oxidative stability.

Example 40

To the polyethylene in Example 9 is added 0.05 percent 1,3-bis(3,5-di-p-n-hexylphenyl-4-hydroxybenzyloxy)-2,2 - bis(3,5 - di - p - n - hexylphenyl - 4 - hydroxybenzyloxymethyl)-n-propane. The resulting composition has improved antioxidant characteristics.

Example 41

Two parts of 1,2,5-tris[3-(2-hexyl)-4-hydroxy-5-(1-naphthylbenzylthio)-4-hydroxy]-n-pentane are added with milling to 100 parts of a low density polyethylene prepared by high pressure polymerization and which has an average molecular weight of 18,000 to 20,000. The resulting product is vastly improved in its oxidative stability.

Example 42

To 10,000 parts of a polyethylene having an average molecular weight of about 100,000 and which has a tensile strength of 5400 p.s.i., a Shore D hardness of 70 and a softening temperature of 130° C. under low load, is added 10 parts of 3,5-di-tert-butyl-4-hydroxybenzyloxyhydroxyethane to prepare a composition of outstanding oxidative stability.

Example 43

To a polyisobutylene polymer having an average molecular weight of 35,000 is added sufficient bis(3,5-di-tert-butyl-4-hydroxybenzyloxy)ethane to give a composition containing 0.03 percent of the antioxidant. The composition has improved antioxidant properties due to the presence of 4,4′-bis(2,6-diisopropylphenol).

In addition to a product of this invention, the saturated hydrocarbon polymers of this invention may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

While $R_1$ and $R_2$ of Formula I have been described without substituents attached thereto it is to be understood that this invention is not restricted to those compounds which are only unsubstituted in those positions but extends also to those compounds where $R_1$ and $R_2$ have substituents such as halogen and nitro groups.

I claim:

1. A compound having the formula

III. 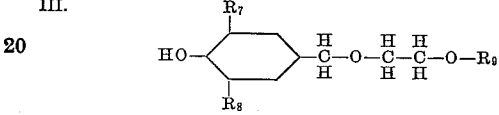

$R_7$ is an alkyl group of from 1–12 carbon atoms, $R_8$ is an alpha-branched alkyl group of from 3–12 carbon atoms, and $R_9$ is selected from the group consisting of hydrogen and radicals having the formula IV. 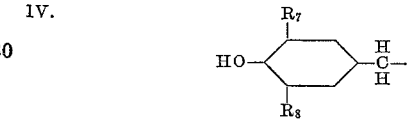

2. A compound of claim 1 wherein $R_9$ is a group having the formula

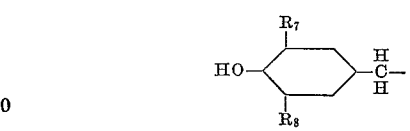

3. Bis(3,5-di-tert-butyl-4-hydroxybenzyloxy)ethane.
4. 3,5-di-tert-butyl-4-hydroxybenzyloxyhydroxyethane.

References Cited

UNITED STATES PATENTS

| | | | |
|---|---|---|---|
| 2,830,025 | 4/1958 | Knowles et al. | 252—52 |
| 2,838,571 | 6/1958 | Filbey | 260—611 |
| 2,875,251 | 2/1959 | Rigterink | 260—611 |
| 2,954,345 | 9/1960 | Filbey | 252—52 |
| 2,967,774 | 1/1961 | Bell et al. | 260—613 X |
| 3,038,878 | 6/1962 | Bell et al. | 260—613 X |
| 3,053,904 | 9/1962 | Rocklin | 260—611 |
| 3,065,275 | 11/1962 | Goddard | 260—609 |

FOREIGN PATENTS

| | | |
|---|---|---|
| 1,071,092 | 12/1959 | Germany. |
| 932,818 | 7/1963 | Great Britain. |

OTHER REFERENCES

Kharasch et al.: Jour. Org. Chem., vol. 22 (1957), pp. 1435–1438.

LEON ZITVER, *Primary Examiner.*

JULIUS GREENWALD, *Examiner.*

P. C. BAKER, B. HELFIN, *Assistant Examiners.*